(12) United States Patent
Kinney et al.

(10) Patent No.: US 7,011,163 B2
(45) Date of Patent: Mar. 14, 2006

(54) HORSESHOE INCLUDING CALKS

(75) Inventors: Edwin L. Kinney, Anaheim, CA (US); Thomas B. Curl, Vero Beach, FL (US)

(73) Assignee: Thoro'Bred Racing Plate, Co. Inc., Anaheim, CA (US)

( * ) Notice: Subject to any disclaimer, the term of this patent is extended or adjusted under 35 U.S.C. 154(b) by 0 days.

(21) Appl. No.: 10/766,507

(22) Filed: Jan. 28, 2004

(65) Prior Publication Data

US 2005/0161233 A1  Jul. 28, 2005

(51) Int. Cl.
*A01L 7/04* (2006.01)
*A01L 7/06* (2006.01)

(52) U.S. Cl. ............................... 168/29; 168/4
(58) Field of Classification Search ............ 168/4, 168/24, 29, 10; D30/150, 148
See application file for complete search history.

(56) References Cited

U.S. PATENT DOCUMENTS

| | | | |
|---|---|---|---|
| 100,328 A * | 3/1870 | Koberge | 168/24 |
| 167,027 A | 8/1875 | Seymour | |
| 208,844 A | 10/1878 | Penrose | |
| 225,259 A | 3/1880 | Williams | |
| 374,924 A * | 12/1887 | Billings | 168/24 |
| 477,476 A * | 6/1892 | Turcott | 168/29 |
| 492,665 A * | 2/1893 | Doyle | 168/13 |
| 507,276 A * | 10/1893 | Kline | 168/24 |
| 511,010 A * | 12/1893 | Eckart | 168/24 |
| 514,011 A * | 2/1894 | Kinnear | 168/29 |
| 518,772 A | 4/1894 | Bach | |
| 541,956 A | 7/1895 | Benfield | |
| 591,166 A * | 10/1897 | Hall | 168/43 |
| 766,039 A * | 7/1904 | Hoffman | 168/28 |
| 825,179 A * | 7/1906 | Bechtel | 168/29 |
| 893,481 A | 7/1908 | Gordon | |
| 894,942 A | 8/1908 | Drown et al. | |
| 1,035,969 A * | 8/1912 | Kiefer | 168/29 |
| 1,134,074 A | 3/1915 | Courlaender, Jr. | |
| 1,212,592 A | 1/1917 | Walsh | |
| 1,447,153 A | 2/1923 | Sala | |
| 2,758,655 A | 8/1956 | Crump | 168/13 |
| 3,159,220 A | 12/1964 | Gist et al. | 168/24 |
| 3,425,493 A | 2/1969 | Kulak | 168/4 |
| 3,460,627 A | 8/1969 | Teixeira | 168/29 |
| 3,494,422 A | 2/1970 | Clark | 168/4 |
| 3,548,947 A | 12/1970 | Mackay-Smith | 168/29 |
| 4,091,871 A | 5/1978 | Chiaramonte et al. | 168/4 |
| 4,207,947 A | 6/1980 | Cope et al. | 168/29 |

(Continued)

FOREIGN PATENT DOCUMENTS

GB  2 124 466 A  8/1982

*Primary Examiner*—Son T. Nguyen
(74) *Attorney, Agent, or Firm*—Westman, Champlin & Kelly, P.A.

(57) ABSTRACT

The present invention teaches a horseshoe including a plurality of calks for enhancing traction. The calks are located on sloped interior side wall portions of the horseshoe. Each calk includes a small rounded leading end and a rearwardly and outwardly tapered surface for permitting the horseshoe to slide forwards during the braking or planting phase of the gait cycle. Further, each calk includes a grab surface on the trailing end for enhancing traction during the propulsive or thrust phase of the gait cycle. The horseshoe of the present invention can reduce the magnitude of the shock loads experienced by a horse during the hoof planting phase by sliding slightly on the hoof lands, and improve traction with the rear grab surface during the propulsive phase of the gait cycle.

16 Claims, 6 Drawing Sheets

U.S. PATENT DOCUMENTS

| | | |
|---|---|---|
| 4,690,222 A | 9/1987 | Cameron ................. 168/4 |
| D292,333 S | 10/1987 | Cameron ................. D30/35 |
| 4,899,824 A | 2/1990 | Techer et al. ............. 168/4 |
| D306,922 S | 3/1990 | Anderson ............... D30/148 |
| D310,898 S | 9/1990 | Kulak .................... D30/148 |
| D310,899 S | 9/1990 | Kulak .................... D30/148 |
| D310,900 S | 9/1990 | Kulak .................... D30/147 |
| D311,793 S | 10/1990 | Kulak .................... D30/148 |
| 4,972,909 A | 11/1990 | Rose ..................... 168/4 |
| 4,993,494 A | 2/1991 | Tuunanen ............... 168/4 |
| 5,004,052 A | 4/1991 | Appleton ................ 168/4 |
| 5,048,614 A | 9/1991 | Klimko .................. 168/29 |
| 5,105,891 A | 4/1992 | Noffsinger .............. 168/13 |
| 5,205,362 A | 4/1993 | Noffsinger .............. 168/13 |
| 5,320,184 A | 6/1994 | Noffsinger .............. 168/13 |
| 5,566,765 A | 10/1996 | Ovnicek ................. 168/4 |
| 6,082,462 A | 7/2000 | Lyden .................... 168/24 |
| 6,454,016 B1 | 9/2002 | Julien .................... 168/4 |

\* cited by examiner

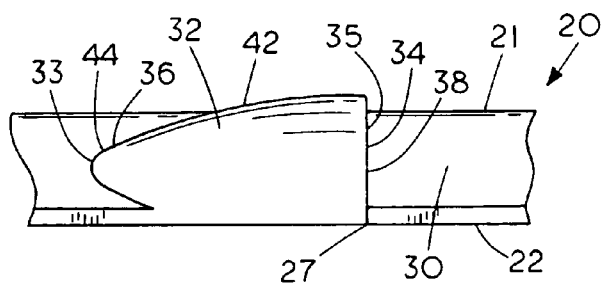
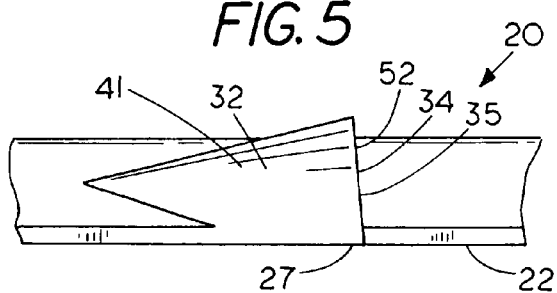
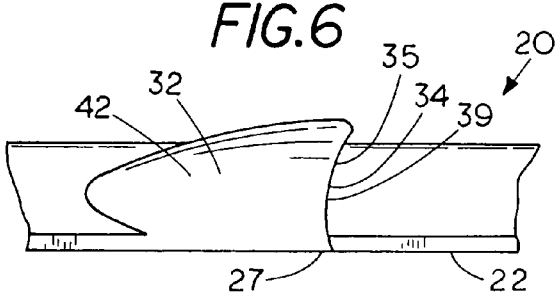
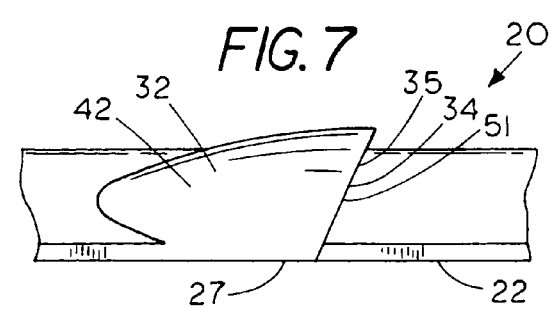
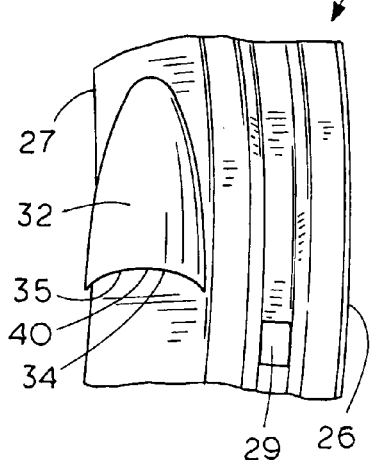
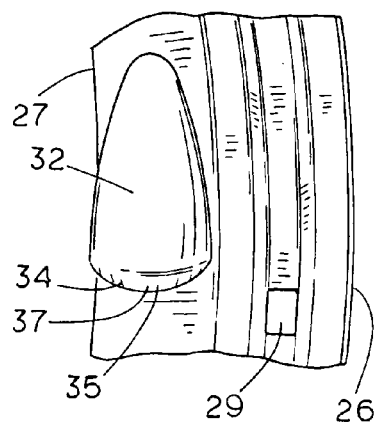

HORSESHOE INCLUDING CALKS

FIELD OF THE INVENTION

The present invention relates generally to the field of horseshoes, and in particular, to horseshoes which include a plurality of calks or projecting legs for enhancing traction.

BACKGROUND OF THE INVENTION

The present invention teaches a horseshoe including a plurality of calks or projecting lugs for enhancing shoe traction. The calks are located on a downwardly facing sloped interior wall of the horseshoe. Each calk comprises an elongated member having a rounded shape on the leading end for permitting the horseshoe to slide forward during the braking or hoof planting phase of the gait cycle. Further, each calk has a grab surface on the rear end side that provides a reaction surface for enhancing traction during the propulsive or thrust phase of the gait cycle. Accordingly, the horseshoe of the present invention can reduce the magnitude of the shock loads experienced by a horse during the hoof planting or braking phase, and improve traction during the propulsive or thrust phase of the gait cycle.

Prior patent references have recited and shown the inclusion of calks, grabs, or other protrusions on the ground engaging side of a horseshoe for enhancing traction. The configuration of these horseshoes are often such that the calks project from the bottom surface of the horseshoe in a manner that causes the hoof of a horse to be elevated more than a plane along the bottom of the shoe relative to the ground support surface. This is generally undesirable in the case of a racehorse, as elevation of the hoof can be associated with a high center of gravity and greater instability when running the turns on an oval track. Moreover, the configuration of such calks, grabs, or other protrusions are often such as to cause rapid deceleration and thereby impart high shock loads upon a horse's hoof and leg during the braking or planting phase of the gait cycle.

Other prior patent references disclose horseshoes having a sloped interior wall portion between the position of the shoe toe grab and the fullering grooves and holes for receiving nails, and the inside edge of the horseshoe. Further, some of these references have recited and shown the inclusion of a plurality of calks, grabs, or other protrusions on this sloped interior wall portion or region, such as U.S. Pat. No. 541,956 granted to J. Benfield in 1895, and also UK Patent Application 2,124,466A by James Wilson published in 1984. In this regard, the amount of drag and traction produced by the calk structures in a horseshoe made in accordance with U.S. Pat. No. 541,956 to Benfield would be relatively equal whether the horseshoe would be sliding forward during the braking phase, or whether the horseshoe would be being driven rearward during the propulsive or thrust phase of the gait cycle. In contrast, the amount of drag and traction produced by the calk structures associated with a horseshoe made in accordance with UK 2,124,466A by Wilson, would be less when the horseshoe would be sliding forwards during the braking phase, and greater during the propulsive phase of the gait cycle. However, not unlike a human being, the heel portion a horse's hoof normally makes the initial contact with the ground support surface during hoof strike or planting, and the toe portion is then lowered to the support surface. During the subsequent propulsive or thrust phase of the gait cycle, the heel portion of the hoof is then the first portion to be lifted from the support surface. In this regard, the projections or calks present on the rear portion of the horseshoe taught in UK 2,124,466A by Wilson can cause the horseshoe to snag or grab the ground support surface during the braking or hoof planting phase of the gait cycle more suddenly than is desired due to the sharp leading edges and generally transverse orientation of the projections or calks recited and shown therein. This can have a number of undesirable side effects such as decreasing a horse's effective stride length and speed, increasing the shock loads imparted to a horse, and causing biomechanical changes with respect to footpath during the gait cycle which can adversely affect the running economy of a horse, particularly a race horse.

Accordingly, it is an object of the present invention to provide a horseshoe including a plurality of projections or calks which do not substantially increase the elevation of a horse's hoof with respect to dirt or grass support surfaces. Further, it is an object of the present invention to provide a horseshoe including a plurality of calks having a grab surface on their rear side for reacting the rearward forces or thrust on the thrust phase against the support surface for enhancing traction during the propulsive or thrust phase of the gait cycle.

SUMMARY OF THE INVENTION

The present invention relates to a horseshoe including a plurality of projections or calks for enhancing traction. The calks are located on the sides of the horseshoe and as shown within a sloped interior, downwardly facing formed wall portion of the horseshoe. Each calk comprises a rounded leading end that tapers and expands rearwardly at least on lower sides for permitting the horseshoe to slide forward slightly during the hoof planting or braking phase of the gait cycle. Further, each calk comprises a grab reaction surface of the rear for enhancing traction during the propulsive or thrust phase of the gait cycle.

The horseshoe of the present invention comprises a top side that rests against the hoof of a bottom side for bearing against a support surface (ground), and a front side toe region. The horseshoe shape provides two spaced apart quarter regions (the sides), with each quarter region ending in a heel (a rear end). A fullering groove is provided with a plurality of openings in the groove for nails. Specifically, the horseshoe has a downwardly facing sloped interior wall, and a plurality of calks. The calks each comprise a projection elongated in fore and aft direction having a narrow rounded leading end and a rounded outer lower surface that tapers and expands in rearward direction for permitting the horseshoe to slide forward during the hoof planting or braking phase of the gait cycle. The rear ends of the calks have a grab surface for enhancing traction during the propulsive phase of the gait cycle. The calks are located within the quarter or side wall sections and on the sloped downwardly facing interior wall of the horseshoe.

The preferred horseshoe is made of a metal material such as steel, or aluminum. Alternatively, at least a portion of a horseshoe of the present invention can be made of a plastic material, a composite material, or a natural or synthetic rubber material.

The downwardly sloped interior wall portion of the horseshoe may comprise a concave shape, thus at times being described as a concave interior wall.

The preferred horseshoe comprises four calks or projections. Alternatively, a horseshoe according to the present invention may comprise six, eight, or another different number of calks. The calks should be symmetrical about a fore and aft central line of the horseshoe. The calks leading ends each may comprise a conical shape, or alternatively, a semi-conical rounded shape on the lower bottom sides for permitting the horseshoe to slide forward during the braking phase of the gait cycle. The inner side of the calks blend into the sloped interior wall of the horseshoe and the expanding rearward taper permits the horseshoe to slide forward during the planting or braking phase of the gait cycle. Each of the calks also has a lateral, rearwardly facing and grab surface. The rearwardly facing surface can be substantially perpendicular to the plane of the top side of the horseshoe. The surface of the calks on the interior sides are shown as planar surfaces perpendicular to the plane of the top surface.

Alternatively, the calks can each have a grab surface on their posterior sides comprising sloped rearwardly facing surfaces or convex or concave surfaces. The grab surfaces on the posterior sides may be slanted or inclined at an angle in the range between 30 and 90 degrees relative to the plane of the top side of the horseshoe. The preferred calks extend downwardly from the sides of quarters of the horseshoe within the sloped interior wall portion of the horseshoe and have rounded portions that extend downwardly beyond the plane of the bottom of the horseshoe.

BRIEF DESCRIPTION OF THE DRAWINGS

FIG. 4 is a side view of a calk or projection having a semi-conical rounded leading end and a flat reaction posterior surface as shown in FIGS. 1–3.

FIG. 4A is a reclined view taken on line 4A—4A in FIG. 4;

FIG. 5 is a side view of an alternate calk having a conically shaped leading end.

FIG. 6 is a side perspective view of an alternate calk having a concave posterior surface that forms a grab.

FIG. 7 is a side view of an alternate calk having a slanted posterior surface which is inclined from the top of the horseshoe rearwardly at an angle in the range between 30–90 degrees relative to a plane associated with the top side or hoof side of the horseshoe.

FIG. 8 is a bottom view of an alternate calk including a concave curved rear reaction surface.

FIG. 9 is a bottom view of an alternate calk having a convex surface rear reaction.

DETAILED DESCRIPTION OF THE PREFERRED EMBODIMENTS

The present invention teaches a horseshoe including a plurality of calks or projections for enhancing traction. The calks are located within the sloped interior portion of the horseshoe. Each calk comprises an elongated body having a narrow rounded leading end and a tapered expanding lower surface extending rearwardly to permit limited sliding of the hoof during a braking or hoof planting phase of the gait cycle. Further, each calk comprises a grab surface or reaction surface on the rear end for enhancing traction during the propulsive or thrust phase of the gait cycle. Accordingly, the horseshoe taught in the present invention can slide forward to reduce the magnitude of the shock loads experienced by a horse during the hoof planting or braking phase, and improve traction with the rear facing reaction surface during the propulsive or thrust phase of the gait cycle.

A horseshoe of the present invention is indicated generally by numeral 20. A decimal point and a numeral suffix will be added to number 20 in order to distinguish separate embodiments of the invention.

Figure 1:
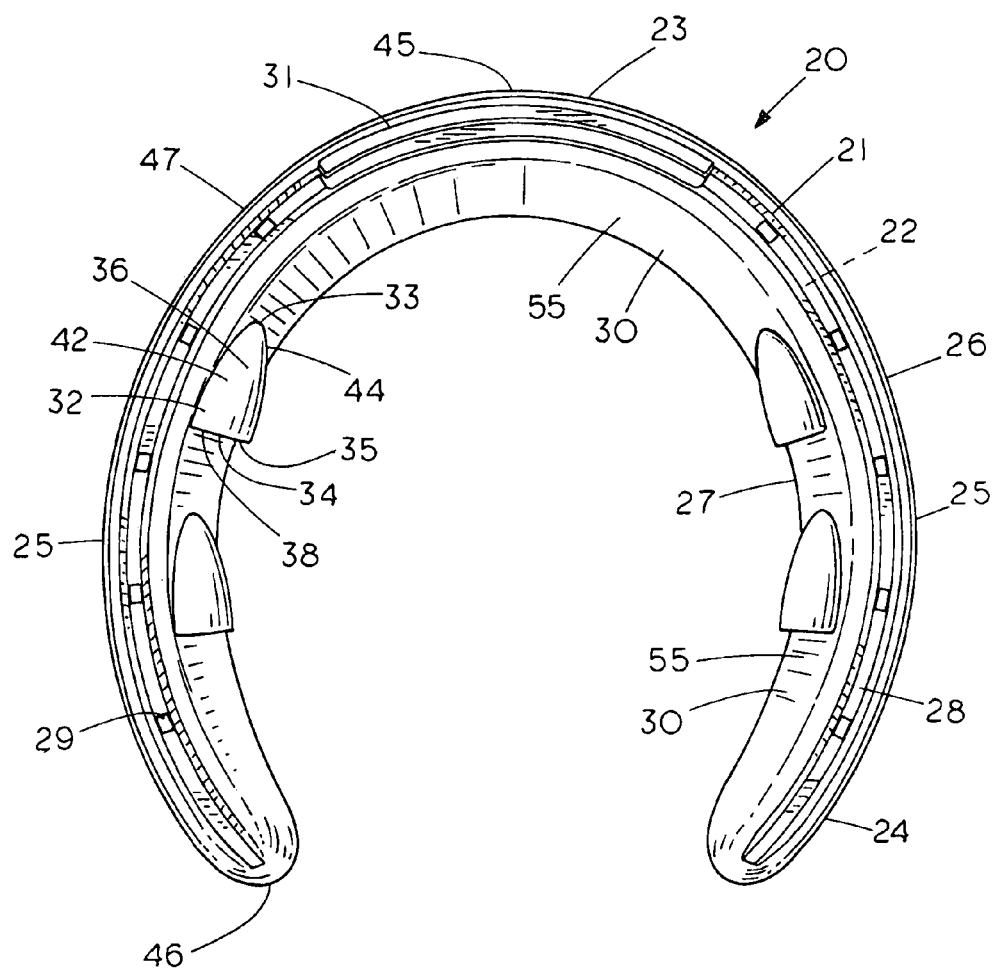
FIG. 1 is a bottom plan view of a horseshoe of the present invention.

FIG. 1 is a bottom plan view of a horseshoe 20.1 of the present invention. The horseshoe 20.1 has a planar top side surface 22 shown in FIG. 2 for supporting the hoof of a horse, a bottom side 24 for bearing against a support surface, a front end 45, a back or rear end 46, a toe region 23, two quarter or side wall regions 25 each including a heel region 24, an outside edge 26, an inside edge 27, a fullering groove 28 that extends around the horseshoe in the lower surface 21. A plurality of openings 29 are provided for receiving a plurality of nails. The shoe has a downwardly facing outwardly sloped interior wall portion 30 that extend outwardly from the inside, a toe grab 31 extend downwardly at the toe of the horseshoe. A plurality of calks or projections 32 are formed on the sloped interior wall and extend downwardly from sloped wall 30. The sloped interior wall portion 30 extends between the inside edge 27 and the beginning of the fullering grooves 28 which are present in the lower surface 21. In the toe region 23 the sloped inter portion generally extends between the inside edge 27 and the toe grab 31. The sloped interior wall 30 can have a beveled, curved, or concave surface shape.

The calks or projection 32 each have a rounded lower side shape 36 at their forward ends 33 for permitting the horseshoe 20.1 to slide forwards during the braking or hoof planting phase of the gait cycle. The anterior or leading end of the calks are generally bullet shaped. In this regard, the calks 32 can include a rounded lower front 44 that merges with the sloped interior portion 30 of the horseshoe 20.1. As shown in FIG. 4, the preferred calks 32 are elongated along a longitudinal axis and have a rounded rearwardly tapering lower or bottom surface 42. Alternatively, the leading ends of the calks can have a conical shape 41, as shown in FIG. 5.

Further the posterior sides 34 of the calks form grabs for enhancing traction during the propulsive or thrust phase of the gait cycle. The calks 32 are located within the horseshoe on the quarter regions 25 and on the downwardly facing sloped interior wall portion 30 of the horseshoe 20.1. The calks 32 are preferably four, six, or eight in number, but other numbers of calks can be used, as desired. However, there can exist a trade-off, that is, as between the number of the calks being used, versus the size of the calks being used, with respect to providing optimal traction for different surfaces. In this regard, sand or dirt used on many oval tracks consists of a flowable solid, and the consistency of the surface can be directly affected by being watered. Given normal dirt tract conditions, and in particular, when the surface is loose or slippery, the use of fewer and larger calks generally provides better grip and traction, more specifically, a number in the range between 4–8 calks.

The rear end 34 of the calks 32 can have a flat rear surface 38 that is approximately perpendicular with the plane 43 associated with the bottom side 21 of the horseshoe 20.1, and perpendicular to the central fore and aft bisecting line of the horseshoe as shown in FIGS. 1–4.

Alternatively, the posterior side 34 of the calks can have shapes as shown in alternate embodiments in FIGS. 5–9 as will be explained. Any or all of these configurations can be used whether on one or more calk or a horseshoe 20 in various possible combinations. An effective grab surface on each calk in formed transversely to the shoe fore and aft direction, which also in the direction of movement of the shoe in use to react hoof thrust for enhancing grip and traction on the rear side 34 of the calks.

As shown in FIGS. 1–4, the preferred horseshoe 20 is made of a metal material 47 such as a low carbon steel, or aluminum such as an aircraft grade aluminum alloy. In this regard, a steel or aluminum horseshoe can be made using conventional cutting, forging, trimming, pressing, heat treatment, sanding, de-burring, and burnishing techniques. For example, an aluminum horseshoe can be made from a rod of aircraft grade aluminum alloy stock that is cut to an appropriate length and then bent to form a U-shaped blank. The blank is placed upon a forge heated to forging temperature, for example in the range of 800 degrees Fahrenheit, and then forged with a forging die to form the blank into a forged horseshoe having a desired configuration and shape. The forged horseshoe can then be trimmed upon a trimming press using a trimming die in order to remove any excess flash material. The forged and trimmed horseshoe can then be punched upon a punch press using a punching die to form a plurality of nail holes in the horseshoe. The resulting horseshoe is then heat treated as is known in the art, for example, heating at about 900 degrees for thirty minutes in a heat treatment furnace, and then water quenching the horseshoe. The nearly finished horseshoe is then sanded and de-burred, and then can be burnished using aluminum oxide rock in a tumbler for a length of time desired in order to smooth and polish the surface of the horseshoe.

Figure 10:
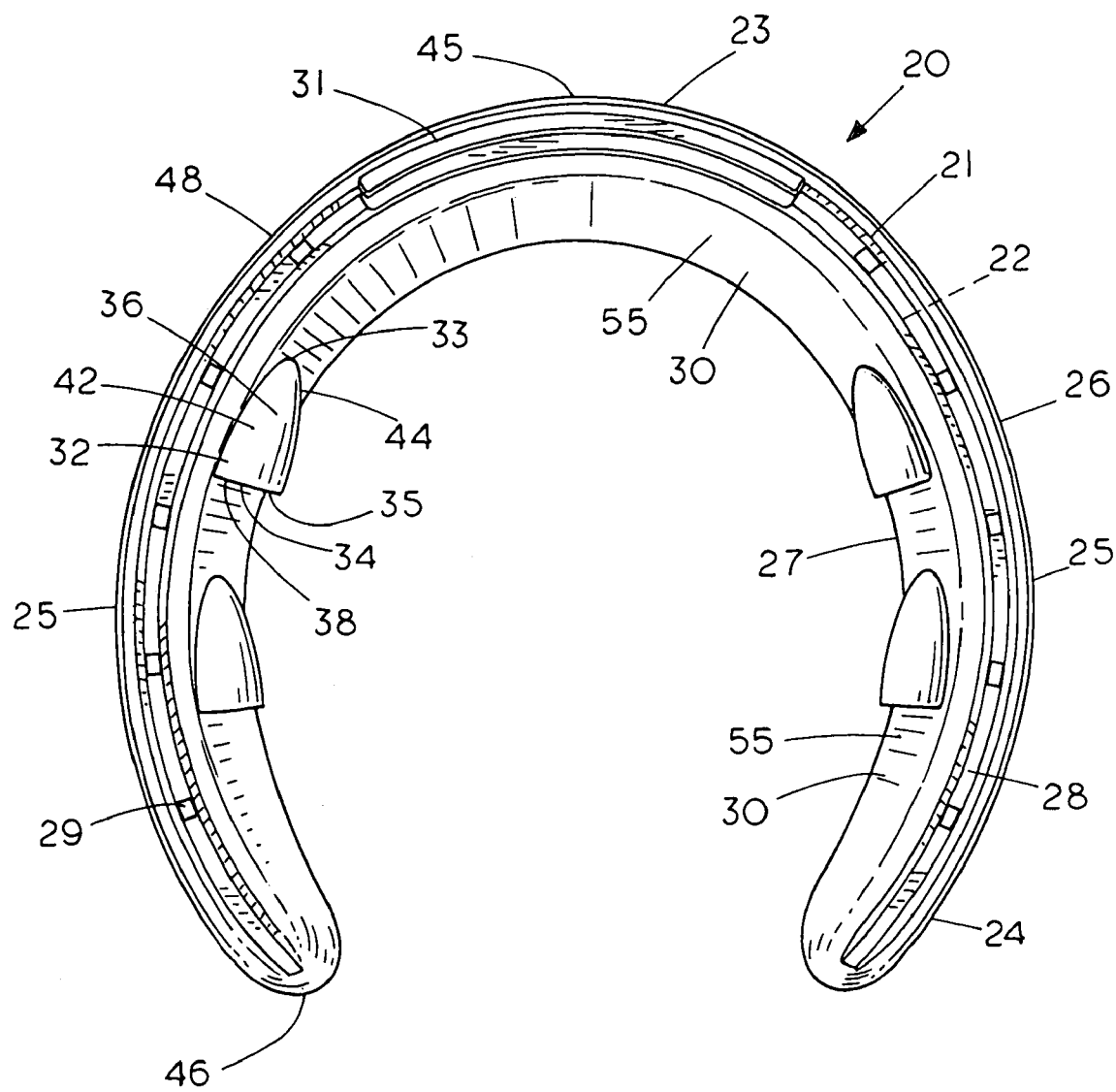
FIG. 10 is a bottom plan view of a horseshoe generally similar to that shown in FIG. 1, but made of a plastic material.
Figure 11:
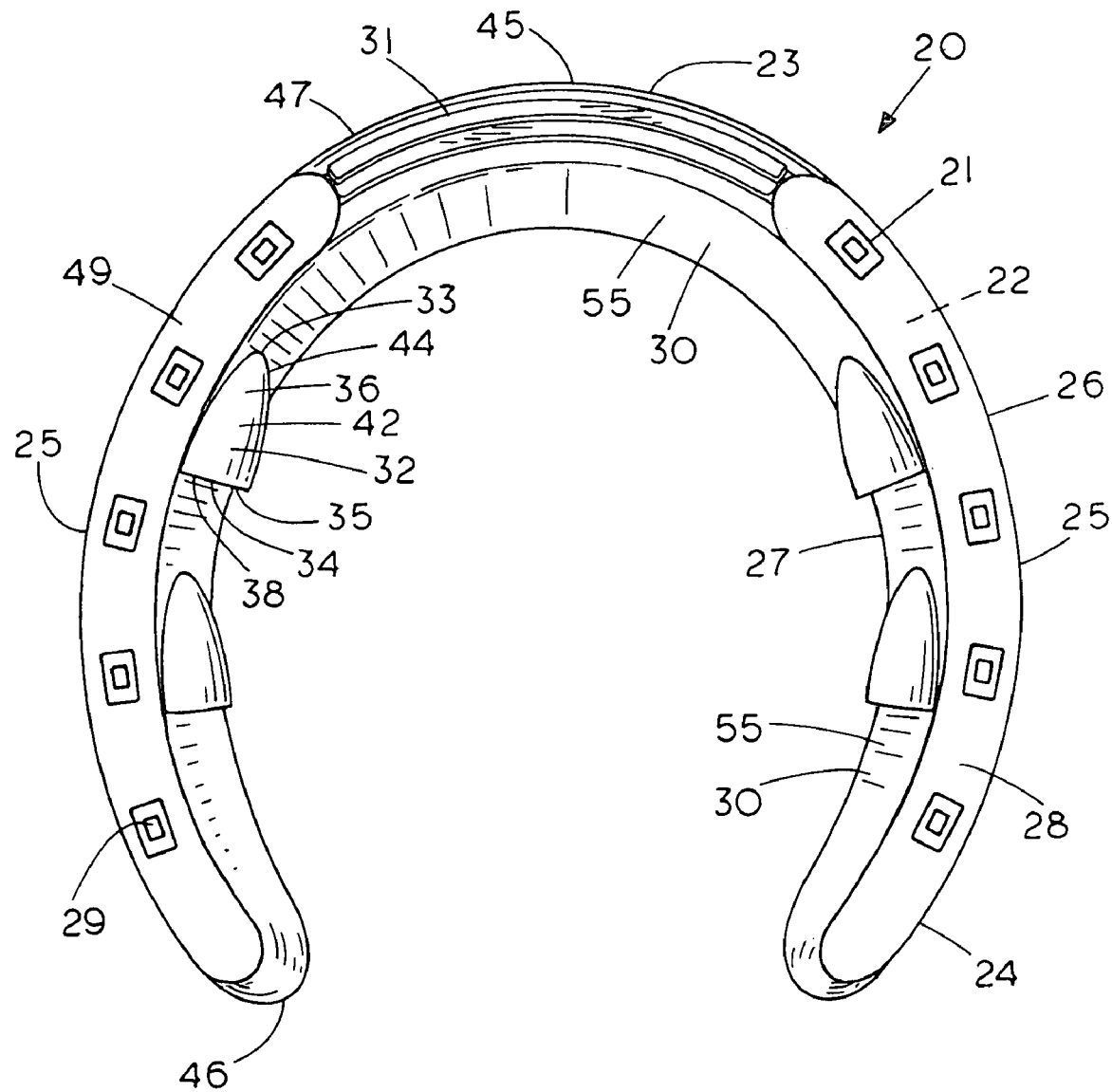
FIG. 11 is a bottom plan view of a horseshoe generally similar to that shown in FIG. 1, but formed of a bonded rubber material.

Alternatively, as shown in FIG. 10, a horseshoe according to the present invention can be made of a plastic material 48 such as polyurethane using conventional molding techniques. Alternatively, the horseshoe can further include a bonded rubber material 49, as shown in FIG. 11. The rubber material 49 can consist of a thermoset rubber such as nitrile rubber or styrenebutadiene rubber, or alternatively, can consist of a thermoplastic rubber or other thermoplastic elastomer. The rubber material 49 can be overmolded and bonded to the metal portion of the horseshoe using conventional molding and bonding techniques.

Figure 2:
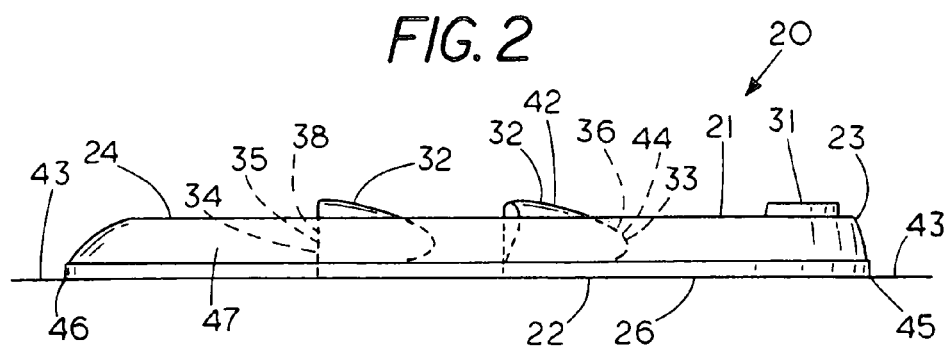
FIG. 2 is a side view of the horseshoe shown in FIG. 1 therefore invented.

FIG. 2 is an inverted side view of the horseshoe 20.1 shown in FIG. 1. As shown, the extension of the rounded bottom of the calks 30 below the plane of surface 21 is preferably equal to or less than the protrusion of extension of the toe grab 31 located in the toe region 23 of the horseshoe 20.1. Accordingly, a horse's hoof will not be placed in either a positive or negative heel position by virtue of wearing a horseshoe 20.1 of the present invention. In addition, when moving on a hard and possibly wet surface, such as concrete, the presence of the calks 32 does not reduce the contact area of the bottom surface 21 of the horseshoe 20.1 with the underlying support surface, and slipping can thereby be avoided.

Figure 3:
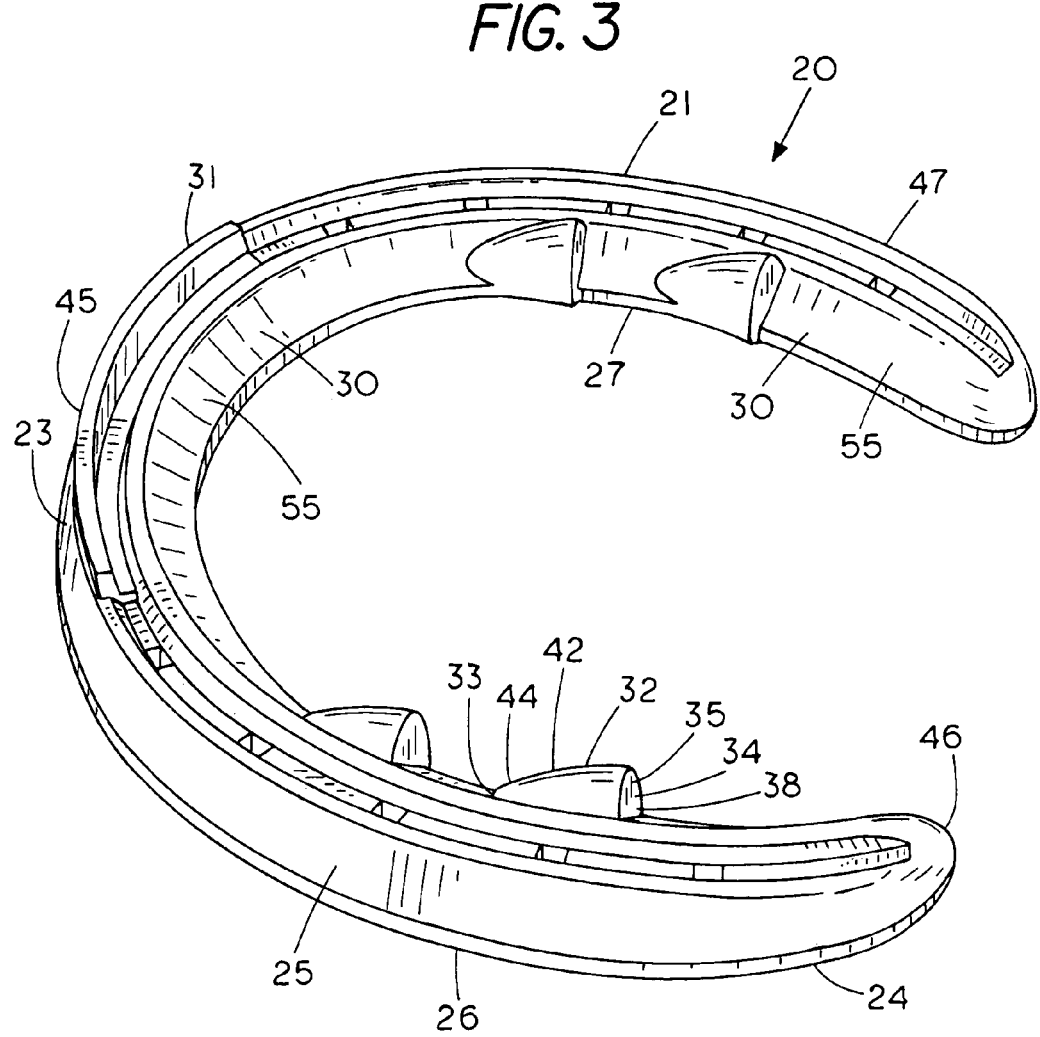
FIG. 3 is a bottom perspective view of the horseshoe shown in FIGS. 1 and 2.

FIG. 3 is a perspective view of the horseshoe 20.1 shown in FIGS. 1 and 2. The sloped interior portion 30 of the horseshoe 20.1 can have a beveled, curved, or concave shape. Shown in FIG. 3 is a horseshoe 20.1 having a concave interior portion 50. As shown, a plurality of calks 32 are located on each of the two side or quarter regions 25, and more specifically, within the sloped interior portion 30 of the horseshoe 20.1.

FIG. 4 is a side view of a calk 32A having a semi-conical leading and rearwardly expanding shape 42 as shown in FIGS. 1–3. As shown, the calk 32A includes both a rounded sloped front end portion 44 and a lower side rounded shape surface 36 generated from the front or toe end 33. In addition, the rear end 34 of the calk 32A has a flat rear surface 38 forming a grab 35 which is approximately perpendicular to the flat plane 43 associated with the top side 21 of the horseshoe 20.1.

FIG. 5 is a side view of an alternate calk 32B having a conical shape 41 at the leading end. As shown, the calk 32B expands from a leading end rearwardly. The rear side 34 of the calk 32B has a flat rear surface 52 that is at a selected rearwardly sloped angle to form a grab 35.

FIG. 6 is a side view of an alternate calk 32C having a concave posterior surface 39 for use with a horseshoe 20 of the present invention. As shown, the calk 32C includes a rounded, rearwardly expanding lower surface 42 from the leading end. The concave rear surface 39 of the calk resembles a claw or talon and forms a grab 35.

FIG. 7 is a side view of an alternate calk 32D having a planar forwardly slanted near reaction surface 51 for use with a horseshoe 20 of the present invention. The slanted rear surface 51 forms a grab 35 and is inclined at an angle in the range between 30–90 degrees relative to the plane 43 associated with the bottom side surface 21 of a horseshoe 20 of the present invention.

FIG. 8 is a bottom view of an alternate calk 32E having a concave curved rear surface 40 for use with a horseshoe 20 of the present invention. As shown, the calk 32E includes the rounded tapered leading end surface 42 extending to the rear surface. Further, the rear concave side 34E of the calk 32E forms a grab 35.

FIG. 9 is a bottom view of an alternate calk 32F having a concave shape curved rear surface 37 for use with a horseshoe 20 of the present invention. As shown, the calk 32F also includes a rounded shape 42 on the leading end. The rear surface 37 forms a grab 35.

FIG. 10 is a bottom plan view of an alternative horseshoe 20.2 generally similar to that shown in FIG. 1, but made of a plastic material 48. In particular, the horseshoe 20.2 can be made of a polyurethane material having a hardness in the range between 65–95 on the Shore A Durometer scale. Calk or projection 32 of any of the previous forms can be used, as shown. The calks are molded in place and the surface shapes and construction are numbered as in FIGS. 1–3 because they can be molded or formed identically.

FIG. 11 is a bottom plan view of an alternative horseshoe 20.3 generally similar to that shown in FIG. 1, but further including a bonded rubber material 49. The rubber material 49 can consist of a thermoset rubber such as nitrile rubber or styrene-butadiene rubber, or alternatively, can consist of a thermoplastic rubber or other thermoplastic elastomer. A rubber bonded horseshoe can be advantageous for use on hard surfaces such as asphalt, and also on hard oval tracks such as those used by Standardbreds. A rubber bonded horseshoe can also sometimes be advantageous for use with horses which have sustained an injury and are in the process of recovery. Again, the calks or projections can be molded in place, and are numbered in FIGS. 1–3.

Figure 12:
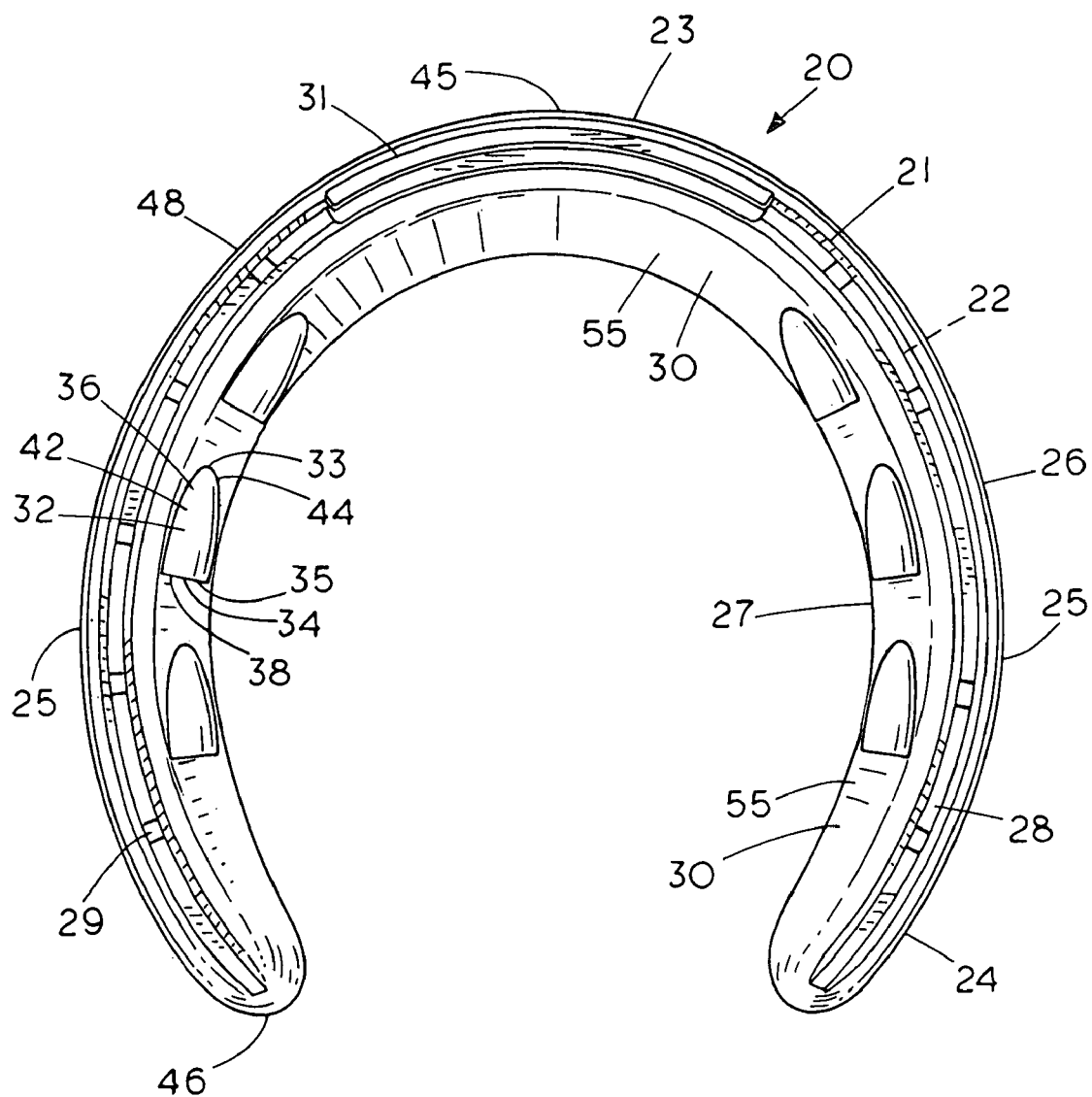
FIG. 12 is a bottom plan view of a horseshoe generally similar to that shown in FIG. 1, including six calks or projections on the shoe.

FIG. 12 is a bottom plan view of an alternative horseshoe 20.4 generally similar to that shown in FIG. 1, but including six calks 32. Alternatively, eight or another different number of calks 32 can be used, as desired. There can exist a trade-off, that is, as between the number of the calks being used, versus the size of the calks being used, with respect to providing optimal traction in some circumstances. In this regard, the sand or dirt composition used on many oval tracks consists of a flowable solid, and the consistency of the surface can be directly affected by being watered. Given normal dirt track conditions, and in particular, when the surface is loose or slippery, the use of fewer and larger calks generally provides better grip and traction, and more specifically, a number in the range between 4–8 calks.

The projection or calks extend outwardly from the wall 30 of the shoe and provide a small rounded leading end with an outer surface that tapers outwardly so it will have less resistance to forward movement than an abrupt surface generally normal to the wall 30. The rear surface of each calk projects outwardly, and it generally is perpendicular or normal to the direction of propulsion or thrust of the hoof during the propulsion or thrust phase of the gait cycle. The rear surfaces will form a reaction surface that will push against dirt, sand, or other surface material to increase the propelling thrust without any slipage on the thrust or propulsion portion of the gait.

Each of the calks is formed as a partial solid body that has a lower side surface is generated about a central axis, and the curvature of the forward portion in section is generally elliptical.

The calk is essentially a solid body that has a lower surface that is generated around centers curved from the leading end in fore and aft direction. The lower surface of the calk that is exposed thus is tapered from an end rearwardly, much like a "bullet" shape and it merges into the surface 30 for support, and extends slightly below the bottom or ground contact plane of the shoe. This is the plane that lies on the surface 21 shown. The extension below the plane of surface 21 is preferably equal to the height or extension of the toe grab.

The forward portion 44 of each of the for example, is spaced from the surface 30 and the rim 27, so that there is a space indicated at 29 for example shown in FIG. 4 that accommodates some sliding of ground or track material into that space.

Although the present invention has been described with reference to preferred embodiments, workers skilled in the art will recognize that changes may be made in form and detail without departing from the spirit and scope of the invention.

What is claimed is:

1. A horseshoe having a top side for supporting a hoof of a horse, a bottom side engaging a support surface, a front end having a toe region forming a leading end of horseshoe, and two spaced side wall portions extending to a rear of the horseshoe, and a plurality of calks on each of the side wall portions, said calks each comprising a rounded leading end and having a rearwardly expanding rounded outer surface protruding from the bottom side and having a rear surface extending from the side wall portions, the rear surface being generally transverse to a fore and aft line between the side wall portions, the calks having a fore and aft length greater than a transverse dimension of the rear surface.

2. The horseshoe of claim 1, wherein the side wall portions and front end have a wall surface on an inner side that slopes at an angle downwardly and faces toward the bottom side.

3. The horseshoe according to claim 2, wherein said wall surface that slopes outwardly is concave.

4. The horseshoe according to claim 2, wherein said calks are supported on said wall surface that slopes outwardly and extend inwardly and downwardly from the wall surface.

5. The horseshoe according to claim 1, wherein said horseshoe is made of one of the materials selected from the group consisting of steel, aluminum, plastic and rubber.

6. The horseshoe according to claim 1, wherein each of the side wall portions has two calks spaced in fore and aft direction.

7. The horseshoe according to claim 1, wherein each of the side wall portions has three calks spaced from each other in fore and aft directions.

8. The horseshoe according to claim 1, wherein said calks each comprise a rounded leading end and an outer surface tapering from the leading end to a larger size in rearward direction.

9. The horseshoe according to claim 1, wherein the rear surface on at least one calk is a flat surface substantially perpendicular to a plane defined by the bottom side of said horseshoe.

10. The horseshoe according to claim 9, wherein said curved surface is one surface of the group consisting of a concave and a convex surface.

11. The horseshoe according to claim 1, wherein the rear surface on at least one of the calks is a curved surface.

12. The horseshoe according to claim 1, wherein said rear surface of at least one calk is inclined at an angle in the range between 30 and 90 degrees relative to the plane of the bottom side of said horseshoe.

13. The horseshoe according to claim 1, wherein said calks are solid elongated bodies that protrude from the side wall portions and are to the interior of said side wall portions of said horseshoe, a part of each of said calks protruding below the plane defined by the bottom surfaces.

14. A horseshoe having a top side, a bottom side, a front side, a back side, a toe region, two quarter regions each including a heel, a sloped interior wall portion along each quarter region, and a plurality of calks on each quarter region, said calks each comprising a rounded shape on an anterior end and a bottom side and continuously expanding to a rear grab surface on a posterior end, said calks being elongated from the anterior end to the rear grab surface and being located on said sloped interior wall portions of said horseshoe.

15. The horseshoe of claim 14 wherein the toe region has a toe grab protruding below the bottom side, the calks extending inwardly from the sloped interior portion and downwardly to protrude below the bottom side substantially equal to the protrusion of the toe grab.

16. A horseshoe having laterally spaced side portions each with a sloped interior wall portion and comprising a plurality of calks on the interior wall portion of each side portion, said calks each comprising a rounded shape on their anterior ends, and having a rounded outer surface expanding rearwardly on a bottom side of the horseshoe and being longitudinally elongated to a posterior end, said calks each comprising a posterior end grab surface extending outwardly toward a center line of the horseshoe from the respective sloped interior portion.

* * * * *

UNITED STATES PATENT AND TRADEMARK OFFICE
CERTIFICATE OF CORRECTION

| | |
|---|---|
| PATENT NO. | : 7,011,163 B2 |
| APPLICATION NO. | : 10/766507 |
| DATED | : March 14, 2006 |
| INVENTOR(S) | : Kinney et al. |

It is certified that error appears in the above-identified patent and that said Letters Patent is hereby corrected as shown below:

Title page, item [73]

Assignee:

"Thoro'Bred Racing Plate, Co. Inc." should be changed to -- Thoro'Bred Racing Plate Co., Inc. --

Signed and Sealed this

Twelfth Day of June, 2007

JON W. DUDAS
*Director of the United States Patent and Trademark Office*